E. G. ROSE.
LAND MARKER.
APPLICATION FILED SEPT. 16, 1911.
1,029,635.
Patented June 18, 1912.
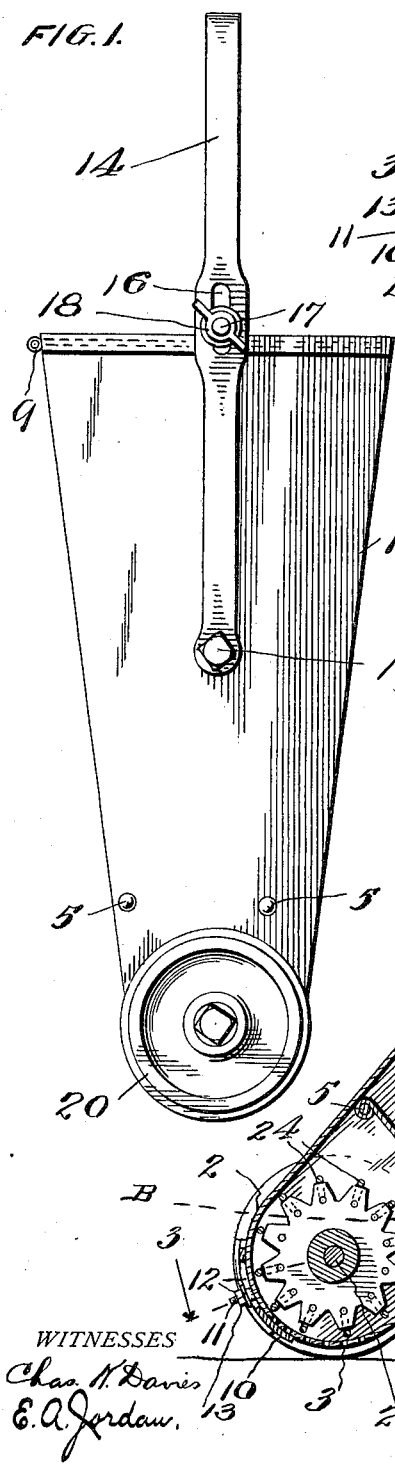
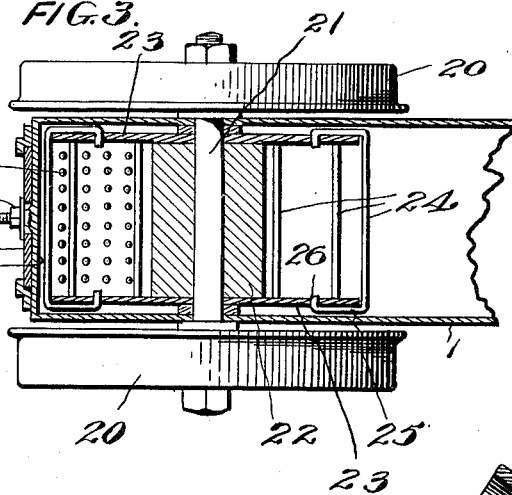
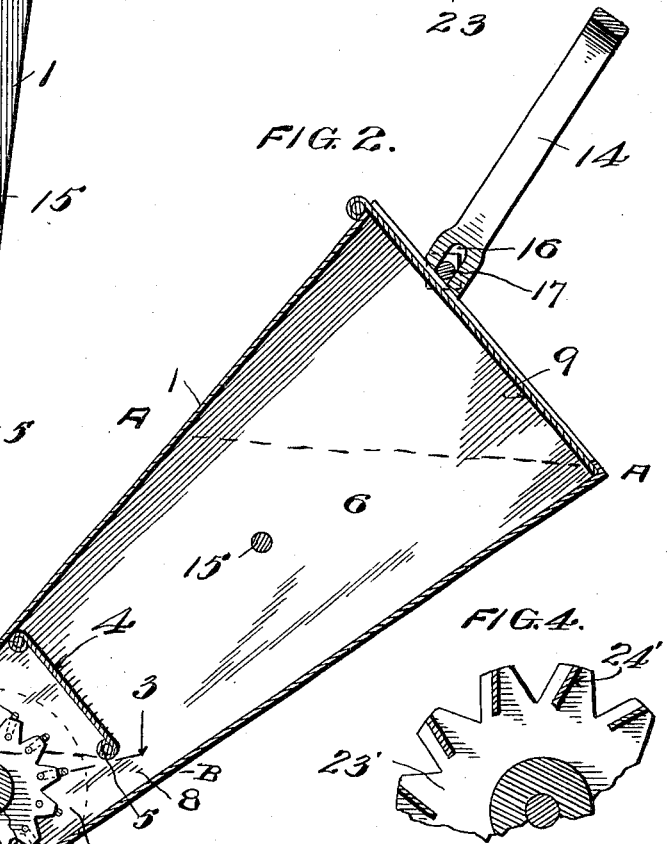
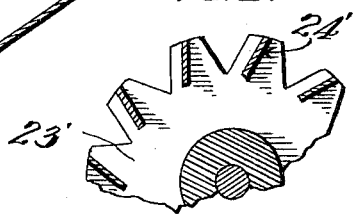
Edwin G. Rose, INVENTOR

UNITED STATES PATENT OFFICE.

EDWIN G. ROSE, OF WASHINGTON, DISTRICT OF COLUMBIA.

LAND-MARKER.

1,029,635.     Specification of Letters Patent.     Patented June 18, 1912.

Application filed September 16, 1911. Serial No. 649,647.

*To all whom it may concern:*

Be it known that I, EDWIN G. ROSE, a citizen of the United States, residing at 1408 Monroe street northwest, Washington, District of Columbia, have invented certain new and useful Improvements in Land-Markers, of which the following is a specification.

The present invention relates to improvements in land markers, and is designed especially for the purpose of providing a lining device for lawn tennis courts, baseball diamonds, football gridirons, etc.

The object of the invention is the provision of a device designed for applying air-slaked lime and similar pulverulent materials to the boundaries of the above inclosures.

The present invention furnishes an inexpensive and durable appliance for depositing a ribbon-like line of uniform width when the machine is in operation, and when not in use the device may be easily handled and transported.

The invention consists in certain improvements in details of construction, and combinations and arrangements of parts hereinafter described and more particularly pointed out in the claims.

In the accompanying drawings I have illustrated one example of the physical embodiment of my invention, and a modified form of a detail of construction, constructed according to the best mode I have so far devised for the practical application of the principles of the invention.

While I have illustrated my preferred form of the invention, it will of course be understood that I do not limit myself to the exact details of construction set forth, but contemplate changes within the scope of my claims.

Figure 1 is a side elevation of the appliance in the position it assumes when being carried to the place of operation. Fig. 2 is a central vertical sectional view of the appliance, as it appears when in use. Fig. 3 is an enlarged detail sectional view on line 3—3 Fig. 2, and Fig. 4 is a fragmentary view of a modified form of stirrer.

In the preferred embodiment of my invention I employ a metallic box or hopper 1, formed at its lower end with a rounded portion 2, which portion is perforated as at 3.

A transverse partition 4, secured within the hopper by means of bolts 5 divides the hopper into two compartments 6 and 7, and these compartments are in communication with each other through the throat or open passageway 8 formed between the end of the partition and the bottom wall of the hopper. The upper open end of the hopper is closed by means of a slide door or gate 9, and the perforated portion at the lower rounded end of the hopper may be entirely or partially closed by means of a similar slide gate 10. To regulate the area of the perforated portion, the gate 10 may be moved to adjusted position and there secured by means of the bolt 11, which projects from the hopper end through slot 12 in the gate 10, and the securing nut 13.

The bail or loop 14 provides a convenient handle for the device, by means of which the appliance may be carried to the place of use, and the handle also performs the function of providing means for manipulating the marker while in use and for adjusting the marker to proper position for such use. To this end the bail is pivoted at its ends on the bolt 15 which extends through the compartment 6, and is free to swing on the bolt as a pivot. Each arm of the bail is formed with a slot 16 through which slots passes the bolt 17, and the bolt is provided with a butterfly nut 18 for clamping against the arm of the bail. By means of the slotted bail and clamping bolt, the position of the device may be adjusted, as in Fig. 2, by moving the bolt toward or from the pivot 15 and securing the bolt between the arms of the bail by means of the nut 18. When thus secured in adjusted position between the side arms the bolt 17 provides a firm support for the upper part of the hopper, the lower end of which is directly supported by the wheels, as will be described.

To provide facile and smooth working of the marker I preferably mount the hopper on a pair of wheels 20 which are secured on the axle 21 which passes through the compartment 7. A stirring device is carried by the axle, and this device comprises a sleeve 22 provided at each end with a disk 23. These disks are connected at frequent intervals about their peripheries by cross rods 24, of any suitable number.

As clearly seen in Fig. 3 the cross rods are bent at their ends, as indicated at 25, and the ends of these bent portions are again bent parallel with the rods to provide hooks 26, which are caught into complementary holes in the disks 23.

In the modified form of stirrer in Fig. 4 the disks 23' are connected by flat strips 24' arranged preferably at the angle indicated. The hopper is filled at the top and the slide gate closed. With the apparatus in position indicated in Fig. 2, the level of the lime in hopper compartment 6 may be as at the dotted line A—A and the level of the lime in compartment 7 may be approximately as indicated by line B—B. A sufficient quantity of lime is permitted to pass from chamber 6 through the throat 8 to supply the compartment 7, and as the device is pushed forward on its wheels, the rotation of the axle also rotates the stirrer and the movement of the rods projects the lime through the perforations 3 and also prevents clogging of the device. The position or angle of the hopper may be determined and adjusted by means of the clamping bolt 17 which supports the hopper at the rear upper end and by means of the handle the hopper may be guided with facility to follow a line. The proximity of the perforations 3 to the ground and the presence of the solid or imperforate wheels 20, which are only slightly greater in diameter than the perforated hopper bottom, serve as wind guards, and prevent waste or displacement of lime due to blowing of the wind.

Having thus fully described my invention, what I claim as new and desire to secure by Letters Patent is:—

1. In a line marker, the combination of a hopper formed with a rounded bottom provided with perforations, an axle passed through the hopper, imperforate supporting wheels on the axle of slightly larger diameter than the rounded hopper bottom, a rotary stirrer in the hopper bottom, and a handle attached to said hopper.

2. In a line marker, the combination of a hopper formed with a rounded bottom provided with perforations, means for opening and closing said perforations, an axle passed through the hopper, imperforate supporting wheels on the axle of slightly larger diameter than the rounded hopper bottom, a rotary stirrer on the axle comprising spaced plates and connecting cross rods, and a handle attached to the hopper.

3. In a line marker, the combination of a hopper formed with a rounded bottom provided with perforations, an axle passed through the hopper, imperforate supporting wheels of slightly larger diameter than the rounded hopper bottom, a rotary stirrer in the hopper, a handle comprising slotted side arms pivoted to the hopper, and a cross bar adjustable in said slotted arms for supporting the upper end of the hopper.

In testimony whereof I affix my signature in presence of two witnesses.

EDWIN G. ROSE.

Witnesses:
FRANKLIN R. HOWE,
EDWARD C. JOLLIFFE.

---

Copies of this patent may be obtained for five cents each, by addressing the "Commissioner of Patents, Washington, D. C."